United States Patent [19]

Shimamoto et al.

[11] Patent Number: 4,472,483

[45] Date of Patent: Sep. 18, 1984

[54] ELECTRICALLY INSULATING SHEET WITH GOOD HEAT CONDUCTIVITY

[75] Inventors: Noboru Shimamoto; Tokio Sekiya, both of Gunma, Japan

[73] Assignee: Shin-Etsu Chemical Co., Ltd., Tokyo, Japan

[21] Appl. No.: 359,057

[22] Filed: Mar. 17, 1982

[51] Int. Cl.[3] .......................... B32B 9/04; B32B 7/02

[52] U.S. Cl. .................................. 428/447; 428/215; 428/446

[58] Field of Search ........................ 428/446, 447, 215

[56] References Cited

U.S. PATENT DOCUMENTS

| | | | |
|---|---|---|---|
| 3,762,978 | 10/1973 | Holmes et al. | 428/447 |
| 4,332,844 | 6/1972 | Hamada et al. | 428/447 |
| 4,433,007 | 2/1984 | Marwitz et al. | 428/447 |

*Primary Examiner*—Marion E. McCamish
*Assistant Examiner*—Beverly Johnson
*Attorney, Agent, or Firm*—Hopgood, Calimafde, Kalil, Blaustein & Judlowe

[57] ABSTRACT

The invention provides an electrically insulating spacer sheet of a silicone rubber used as sandwiched between a heat-generating electric or electronic device or unit, e.g. power transistor, and a heat radiator capable of dissipating the heat with improved heat conductivity. Different from conventional ones, the inventive spacer sheet has coating layers on both surfaces formed of a non-volatile flowable or deformable silicone material so that the condition of adhesive contacting can be greatly improved and the resistance against thermal flow across the spacer sheet can be decreased very much.

2 Claims, No Drawings

ELECTRICALLY INSULATING SHEET WITH GOOD HEAT CONDUCTIVITY

BACKGROUND OF THE INVENTION

The present invention relates to an improved electrically insulating silicone rubber sheet with good heat conductivity or, more particularly, to an electrically insulating silicone rubber sheet with good heat conductivity having adhesiveness exhibiting low contact resistance against thermal flow, which is suitable as a spacer sheet for holding heat-generating devices to be built in various kinds of electronic and electric instruments.

It is a common practice in the prior art that heat-generating electronic or electric devices and units, such as power transistors, thyristors, posistors, rectifiers, transformers and the like, are fixed to a heat-radiator or a metal-made chassis in order to effect good heat dissipation when they are built in an electronic or electric instrument since they are susceptible to the lowering in the performance or even breakage by the temperature elevation caused by the heat generated therein. It is not always desirable in such a mounting that the electronic or electric device or unit is contacted directly with the radiator from the standpoint of the performance or design of the instruments as well as safety so that the device or unit is fixed to the radiator or chassis usually with a spacer sheet of an electrically insulating material intervening therebetween.

The materials for such an insulating spacer sheet are diversified including various kinds of inorganic materials with good heat conductivity such as silica, alumina, boron nitride, magnesia, hydrated alumina, mica and the like and these materials are used as such in the form of a sheet or as dispersed in a finely divided form in the matrix of a cured silicone rubber sheet. These prior art spacer sheets are not quite satisfactory in their performance when used as such and, in addition, there is a problem of misplacing of the spacer sheet due to sliding when an electronic or electric device is mounted on a radiator with the spacer sheet therebetween.

When the insulating spacer sheet is made of an inorganic insulating material such as mica, it is known to coat the surface of the spacer sheet with an oily material so as to improve the contacting condition with the radiator. This method of coating with an oily material is not satisfactory even when the spacer sheet is made of a rubbery material due to the limitation in the adhesive contacting between the spacer sheet and a radiator with incapability to comply with very diversified surface conditions such as the depression caused by the devices or radiators, markings and the like and no sufficient heat conduction is obtained from the device to the radiator with large contacting resistance against heat flow.

Further, cured rubber sheets have no adhesive or sticking power to the surface of a metal and the like solid to prevent slippage so that an outer fastening means, such as screw fastening, is indispensable in order that the spacer sheet is fixed at the correct position between a device and a radiator. Such a fastening means is of course undesirable due to the limitation in the use of screws and the difficulties in the exact positioning even when the design permits the screw fastening. Moreover, the fastening force with the screws cannot be sufficiently large to obtain improvement in the thermal resistance since an excessively large fastening force may destroy the device or the spacer sheet per se.

SUMMARY OF THE INVENTION

It is therefore an object of the present invention to provide a novel and improved electrically insulating spacer sheet for heat dissipation as being used between an electronic or electric device or unit and a radiator free from the above described disadvantages in the prior art spacer sheets.

The inventive spacer sheet comprises a sheet of a cured silicone rubber and a coating layer of a thickness of 0.1 to 100 m on each of the surfaces of the silicone rubber sheet formed of a non-volatile silicone material flowable or deformable under an outer force.

Further object of the invention is to provide a novel method for mounting a heat-generating electric or electronic device or unit on a heat-radiator by sandwiching an electrically insulating spacer sheet made of a cured silicone rubber in which the above described problems of the prior art can be solved.

The method of the invention with the above mentioned object comprises providing a coating layer formed of a non-volatile silicone material flowable or plastically deformable under outer force on each of the surfaces of the spacer sheet of the cured silicone rubber.

DETAILED DESCRIPTION OF THE PREFERRED EMBODIMENTS

As is described above, the inventive spacer sheet of an insulating silicone rubber with good heat conductivity has coating layers of a flowable or deformable silicone material so that excellent adhesive contacting is obtained between a device and the sheet and between the sheet and a radiator even with a small fastening force. Therefore, advantages are obtained that the contacting resistance against heat flow can be remarkably decreased in addition to the prevention of damage to the spacer sheet and easiness in the exact positioning for mounting.

The non-volatile flowable or deformable silicone material as implied above is not limited to the silicone product of particular types in so far as it has an adequate fluidity or deformability and adhesive power including ordinary silicone fluids having a boiling point not lower than 200 ° C., silicone greases and gum-like silicones. It is preferable in order to impart good heat conductivity that these silicones are admixed with various kinds of inorganic fillers such as silica, alumina, boron nitride, magnesia, hydrated alumina, zinc oxide, mica powder and the like.

There is also no particular limitation in the type of the silicone rubber of which the heat conductive, electrically insulating spacer sheet to be coated with the flowable or deformable silicone is made although the silicone rubber is preferable admixed with a heat-conductivity imparting agent hitherto known such as silica, alumina, boron nitride, magnesia, hydrated alumina, zinc oxide, mica powder and the like as dispersed in the matrix of the cured silicone rubber.

Further, it is optional that the silicone rubber sheet includes a reinforcing interlaminar or interlining layer made of a woven cloth of glass fibers or organic fibers, e.g. nylons and polyesters, as well as a film or porous film.

The thickness of the coating layer on each of the surfaces of the cured silicone rubber sheet is desirably as small as possible in so far as the space between the silicone rubber sheet and the heat-generating device or the radiator can be filled with the flowable or deformable silicone material. In principle, the thickness of the coating layer should be larger when the flowable or deformable silicone material is less flowable such as a gum-like silicone in comparison with a silicone fluid of low viscosity. The thickness is usually in the range from 0.1 to 100 μm depending on various parameters.

The combination of a cured silicone rubber sheet and a coating material of the flowable or deformable silicone is particularly advantageous because the cured silicone rubber is more or less swollen with the coating silicone so that the amount of the coating material pressed out is remarkably decreased when the heat-generating device is mounted on the radiator with the intervening spacer sheet of the invention. Further, the high heat resistance of the silicone materials ensures good durability and stable use of the thus mounted heat-generating device which may be heated up to 150 ° C. or higher.

Following is a comparison made between a conventional spacer sheet and an inventive spacer sheet which is prepared by coating both surfaces of the conventional sheet with a flowable and adhesive silicone fluid. Thus, comparison was made between a conventional spacer sheet made of a heat conductive insulating silicone rubber (TC-30, a product by Shin-Etsu Chemical Co.) and inventive spacer sheets prepared by coating both surfaces of the above sheet of TC-30 with (a) a dimethylsilicone fluid (KF-96, a product by Shin-Etsu Chemical Co. having a viscosity of 100 centistokes at 25 ° C. in a thickness of 5 μm, (b) a silicone adhesive (KR-100, a product by the same company) in a thickness of 20 μm or (c) a heat conductive silicone grease (KS-609, a product by the same company) in a thickness of 100 μm. Each of the thus coated silicone rubber sheets was punched to give a test specimen of the specified form. A power transistor (2SD217), model TO-3) was mounted on a heat radiator (model TWA-L120) with the spacer sheet therebetween and a direct current of 3 A at a voltage of 10 volts was supplied to the power transistor. After 20 minutes of the power supply when the transistor and the radiator had reached a thermal equilibrium at 25 ° C. of the ambient temperature, the thermal resistance across the spacer sheet was calculated from the temperature difference between the transistor and the radiator and the power consumption to give the results shown in the table given below. The results indicate that the thermal resistance in the inventive spacer sheet is much smaller than in the conventional silicone rubber sheet.

TABLE

| Coating material | Silicone fluid | Silicone adhesive | Silicone grease | None |
|---|---|---|---|---|
| Thermal resistance, °C/W* | 0.57 | 0.60 | 0.54 | 0.80 |

*The value is for the contacting surface area between the transistor and radiator.

The above given results for the inventive spacer sheets were obtained with a fastening torque of 2 kg·cm between the transistor and the radiator, the value leveling off at larger fastening torque than 2 kg·cm, while at least 5 kg·cm of the fastening torque was required for the uncoated sheet to have the thermal resistance reaching the equilibrium. When the fastening torque was increased over 10 kg·cm the sheet per se was destroyed.

In addition to the above described much smaller thermal resistance, the inventive spacer sheet was also very advantageous by virtue of the adhesive surfaces thereof in the outstanding easiness and reliableness for the exact mounting between the transistor and the radiator.

What is claimed is:

1. An electrically insulating spacer sheet for heat conduction which comprises a sheet of a cured silicone rubber and a coating layer on each of the surfaces thereof formed of a non-volatile silicone material flowable under external force selected from the group consisting of silicone fluids having a boiling point not lower than 200° C., silicone greases and gum-like silicones.

2. The electrically insulating spacer sheet for heat conduction as claimed in claim 1 wherein the coating layer has a thickness in the range from 0.1 to 100 μm.

* * * * *